(No Model.)
C. KELLEY.
TABLE KNIFE.
No. 465,138. Patented Dec. 15, 1891.
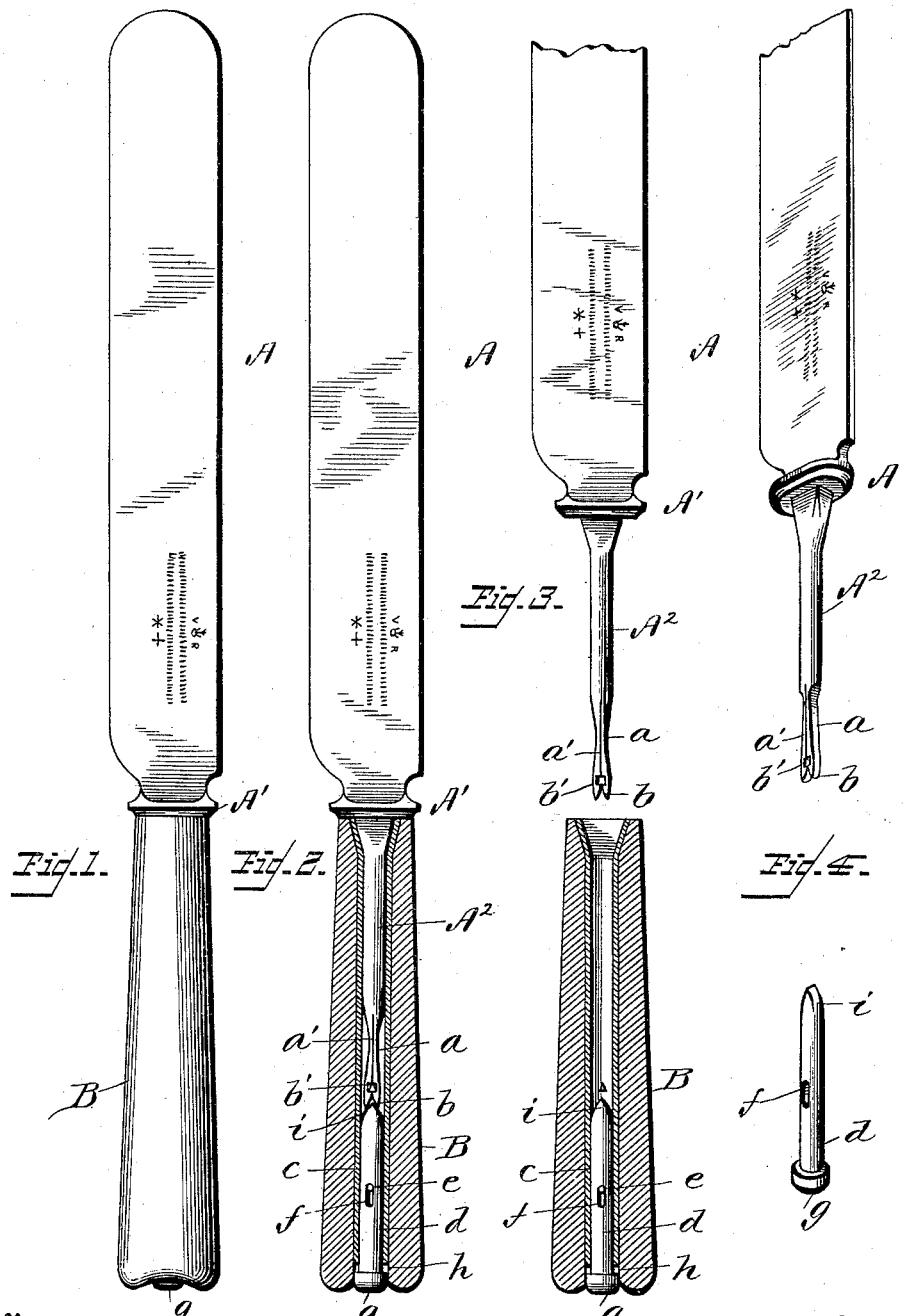

UNITED STATES PATENT OFFICE.

CHARLES KELLEY, OF TORONTO, CANADA.

TABLE-KNIFE.

SPECIFICATION forming part of Letters Patent No. 465,138, dated December 15, 1891.

Application filed April 2, 1891. Serial No. 387,401. (No model.)

*To all whom it may concern:*

Be it known that I, CHARLES KELLEY, a subject of the Queen of Great Britain, residing at Toronto, in the Province of Ontario and Dominion of Canada, have invented certain new and useful Improvements in Detachable Knife-Handles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in handles for cutlery; and it has for its object to provide a handle for table knives and forks which may be quickly and easily detached or replaced when desired.

It is a well-known fact that in the construction of table knives and forks of the more expensive varieties handles of ivory, pearl, and other substances which are liable to be discolored and otherwise injured when subjected to hot water are provided. In order to protect cutlery articles of this character against injury in washing the greatest care is required.

The essential object of the present invention is to provide a detachable handle which may be detached by simply depressing a button seated within a recess in the end of the handle, thus permitting the handle to be cleaned separately without subjecting it to the action of water. After the blade has been cleaned or scoured, as the case may be, the handle may be replaced and will be automatically secured against the possibility of accidental displacement.

To these ends and to such others as the invention may pertain, the same consists in the peculiar construction, adaptation, and arrangement of the mechanism constituting the locking device, all as more fully hereinafter described, shown in the accompanying drawings, and then specifically defined in the appended claim.

The invention is clearly illustrated in the accompanying drawings, which, with the letters of reference marked thereon, form a part of this specification, like letters of reference indicating like parts throughout the several views, and in which drawings—

Figure 1 is a side view of a table-knife provided with my improved handle. Fig. 2 is a similar view with the handle shown in section. Fig. 3 is a similar view with the parts detached, but shown in their relative positions. Fig. 4 is an enlarged detail in perspective.

Reference now being had to the details of the drawings by letter, A designates the blade of the knife, which is provided with an enlarged portion or shoulder A' at its inner extremity, from which extends a shank $A^2$, the end of which is slightly flattened, as shown at $a$, and between these flattened faces is provided a longitudinal slit $a'$, which extends for a short distance into the shank $A^2$. The entrance to the said slit $a'$ is widened or flared outwardly, as is shown at $b$, and within the slit at a point adjacent to the opening is a transverse opening $b'$.

The handle B is provided with an opening within its inner end for the reception of the shank $A^2$ of the blade, the said opening being preferably rectangular in cross-section, so as to adapt it to fit closely over the rectangular base portion of the shank. The outer or free end of the handle is provided with an aperture $c$, within which is seated a pin or shaft $d$. This pin is loosely seated within the seat or recess in the handle, and while it is allowed a limited movement in the direction of its length it is held against greater movement than is desired by a transverse pin $e$, which is passed transversely through a slot $f$ therein. The extreme outer end of the said pin $d$ is provided with a flat head $g$, which is seated within the notch $h$ in the end of the handle, while the opposite end of the said pin is provided with a beveled or arrow-shaped portion $i$, adapted when the pin is forced inward by pressure applied to the head $g$ to enter the notch $b$ in the end of the slit $a'$ in the shank $A^2$, forcing the side walls of the said slit outward and permitting the blade to be withdrawn from the handle. When the blade is replaced, it will be seen that the transverse pin $e$ will enter the notch at the entrance of the slit $a'$, forcing the side walls of the slit outwardly and entering the recess or opening $b'$.

Having thus described my invention, what

I claim to be new, and desire to secure by Letters Patent, is—

The combination, with the shank having a longitudinal slit, of a notch within the entrance of the slit, a transverse opening within the slit adjacent to the entrance, a transverse pin within the handle, adapted to engage said opening and lock the shank within the handle, and a movable pin seated within the end of the handle and adapted when depressed to release the shank from the handle, substantially as and for the purpose described.

In testimony whereof I affix my signature in presence of two witnesses.

CHARLES KELLEY.

Witnesses:
A. L. HOUGH,
FRANKLIN H. HOUGH.